(12) United States Patent
Kato et al.

(10) Patent No.: US 6,375,366 B1
(45) Date of Patent: Apr. 23, 2002

(54) OMNIDIRECTIONAL CAMERA DEVICE

(75) Inventors: Shinichi Kato; Osamu Nishihara, both of Tokyo; Masaki Nakamichi, Fukuoka, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/422,585

(22) Filed: Oct. 21, 1999

(30) Foreign Application Priority Data

Oct. 23, 1998 (JP) .......................................... 10-302904

(51) Int. Cl.[7] .............................................. G03B 15/00
(52) U.S. Cl. ....................... 396/351; 396/427; 348/39; 348/143
(58) Field of Search ................................. 396/427, 351; 348/143, 36, 39

(56) References Cited

U.S. PATENT DOCUMENTS 6,157,018 A * 12/2000 Ishiguro et al. .......... 250/208.1

* cited by examiner

Primary Examiner—David M. Gray
(74) Attorney, Agent, or Firm—Crosby, Heafey, Roach & May

(57) ABSTRACT

An omnidirectional camera device is able to restrict a range in which images of objects are picked up. This omnidirectional camera device comprises a rotationally-symmetric convex mirror (24) fixedly attached to one end of a transparent tube assembly (20), an image pickup means (32) disposed on the other end of the tube assembly in an opposing relation to this convex mirror and a cover assembly (60) disposed on the tube assembly for restricting the range in which light becomes incident on the convex mirror. The cover assembly is mounted on one end side of the tube assembly. The cover assembly is a shielding cover assembly and includes a cover member (60B). The cover assembly is attached to the tube assembly so as to become freely rotatable. The direction and the range in which images of objects should be picked up may be adjusted by the attachment position of the cover assembly and a shielding angle α of the cover assembly. Thus, since undesired video information may be eliminated, only pictures of objects in the desired ranges may be picked up, which becomes effective in analyzing information.

14 Claims, 10 Drawing Sheets

OMNIDIRECTIONAL CAMERA DEVICE

BACKGROUND OF THE INVENTION

1. Field of the Invention

The present invention relates to an omnidirectional camera device for use with a surveillance camera or the like. More particularly, this invention relates to an omnidirectional camera device which is able to pickup not only images of objects in all directions but also only an image of an object in a specified range, thereby hindering the camera device from picking up useless images of extra objects.

2. Description of the Related Art

Heretofore, there is known an omnidirectional camera device capable of picking up images of objects existing in all directions.

FIG. 1 of the accompanying drawings shows such an omnidirectional camera device 10 capable of picking up images of objects in all directions. As shown in FIG. 1, this camera device 10 uses a rotationally-symmetric convex mirror 12, and is able to pick up images of objects in all directions (360°) incident on the convex mirror 12 by an image pickup means, e.g. a video camera 14.

If such omnidirectional camera device which is able to pick up images of objects in all directions is installed at a specified position in the room, we can almost catch all situations within the room as if we were at the actual room. Therefore, since a large number of image pickup means need not be installed at different positions within the same room, this camera device is very suitable for watching the inside of the room and the like.

The direction of objects to be picked up should be restricted, otherwise light incident on the convex mirror 12 will not be introduced into the video camera 14 efficiently. Moreover, when the omnidirectonal camera device 10 is installed near the window in the proximity of the ceiling as shown in FIG. 2, only images of objects in the front directions shown at least by an angular extent 74 are necessary video information, but images of objects in the directions shown by an angular extent −θ are useless video information for a user. On the contrary, it is frequently observed that such useless video information might disturb the user.

SUMMARY OF THE INVENTION

It is an object of the present invention to provide an omnidirectonal camera device in which the aforementioned defects encountered with the prior art can be obviated.

It is another object of the present invention to provide an omnidirectional camera device capable of choosing necessary information and useless information by restricting a range in which light becomes incident on a convex mirror.

According to an aspect of the present invention, there is provided an omnidirectional camera device which is comprised of a rotationally-symmetric convex mirror fixedly attached to one end of a transparent tube assembly, an image pickup device disposed on the other end of the tube assembly in an opposing relation to the convex mirror and a cover assembly being disposed on the tube assembly so as to restrict an extent in which light becomes incident on the convex mirror.

According to the present invention, a shielding cover assembly is rotationally attached to the outside of the tube assembly, whereby an angular extent in which light becomes incident on the convex mirror can be restricted. The extent in which incident light should be shielded and the direction of incident light that should be shielded may be determined by adjusting the attachment position of the cover assembly.

Further, since incident light is shielded by the cover assembly, all undesired information may be eliminated. Hence, the omnidirectional camera system is able to reliably pick up images of objects existing in the necessary directions and necessary ranges.

DESCRIPTION OF THE PREFERRED EMBODIMENTS

An omnidirectional camera device according to the embodiments of the present invention will be described below in detail with reference to the drawings.

Figure 1:
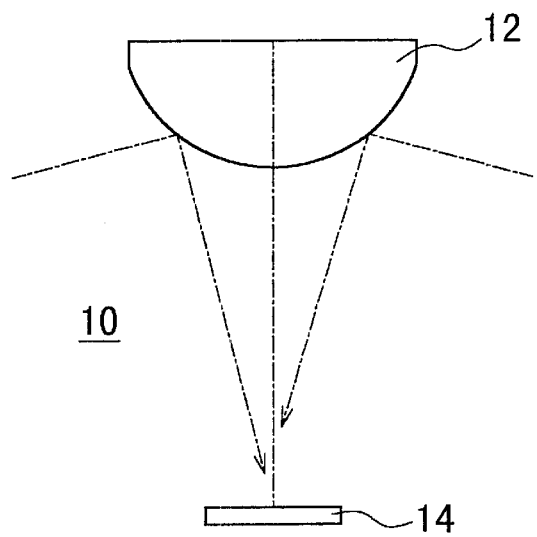
FIG. 1 is a conceptual diagram of an omnidirectional camera device according to the related art.
Figure 2:
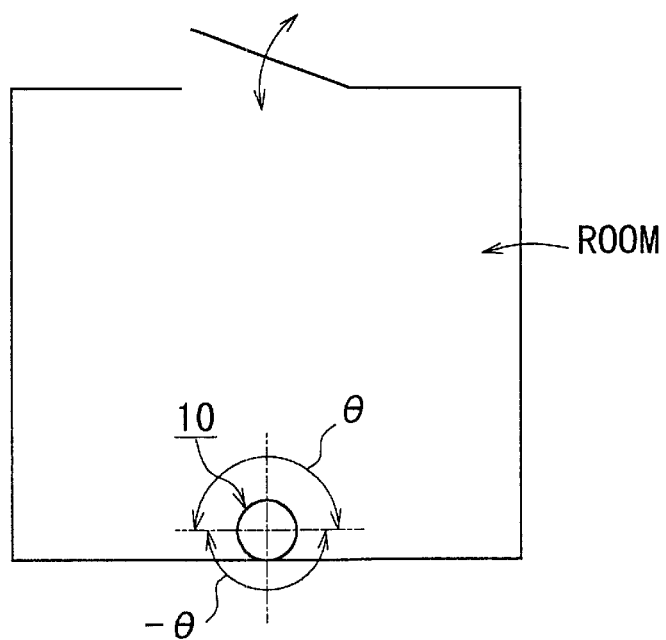
FIG. 2 is a diagram used to explain the necessity of restricting the directions in which images of objects are picked up.
Figure 3:
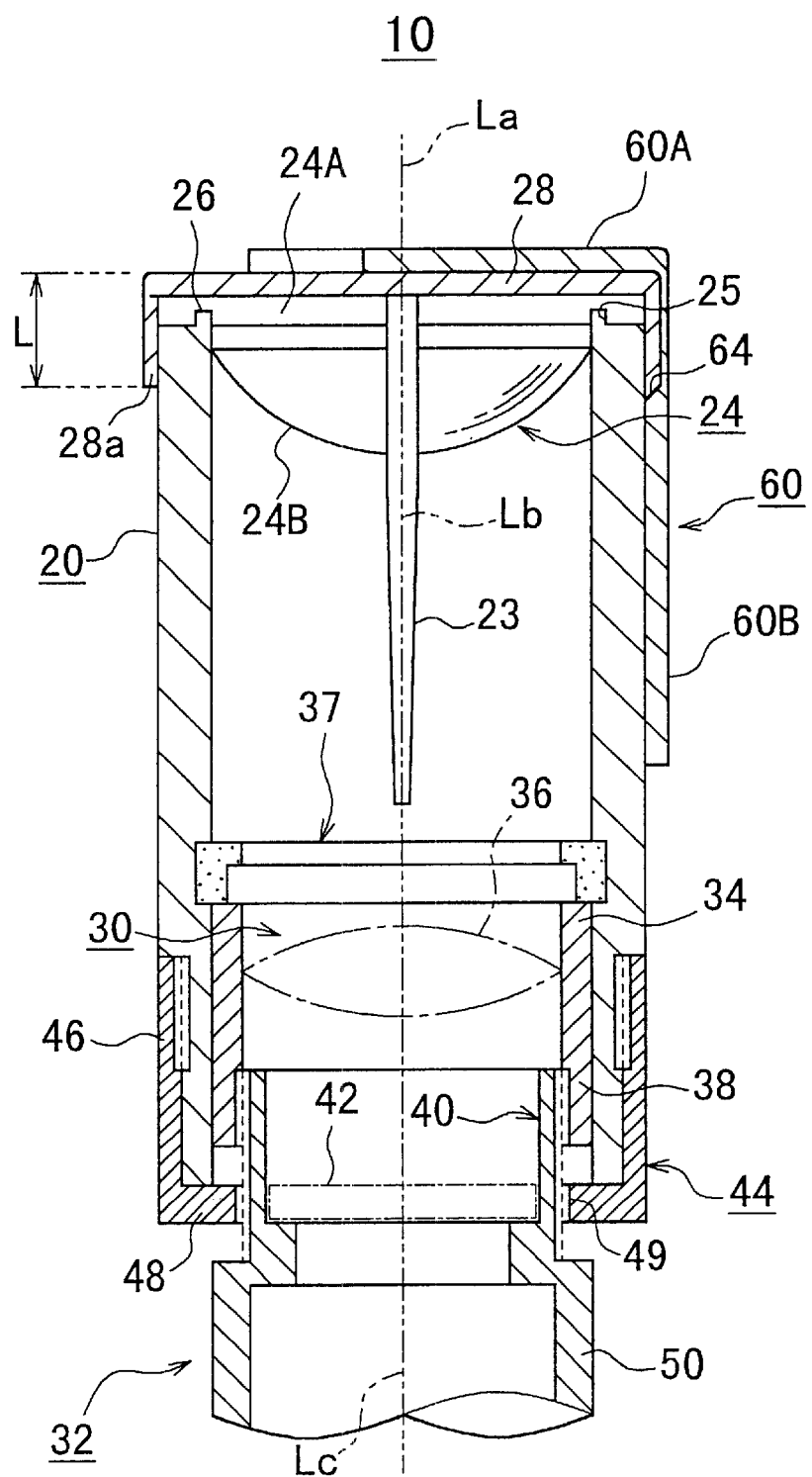
FIG. 3 is a cross-sectional view showing a main potion of an omnidirectional camera device according to an embodiment of the present invention.

FIG. 3 is a cross-sectional view showing a main portion of an omnidirectional camera device 10 according to an embodiment of the present invention. As shown in FIG. 3, the omnidirectional camera device 10 comprises a transparent tube assembly 20 whose respective ends are opened, a convex mirror 24 fixedly attached to one end, e.g. an upper end of the transparent tube assembly 20 and an image pickup means, e.g. a very small video camera 32 fixedly fitted into a lower end side which is the other end of the transparent tube assembly 20.

The tube assembly 20 is made of a transparent material and produced by glass or transparent plastics. Since the dimensions of the tube assembly 20 are determined in accordance with a use of the omnidirectional camera device 10, when the omnidirectional camera device 10 is applied to a surveillance camera and the like, the tube assembly 20 has an outer diameter ranging from approximately one centimeter to several centimeters and a length of several centimeters. The outer and inner peripheral surfaces of the tube assembly 20 are produced by mirror finishing more than a certain extent.

Figure 4:
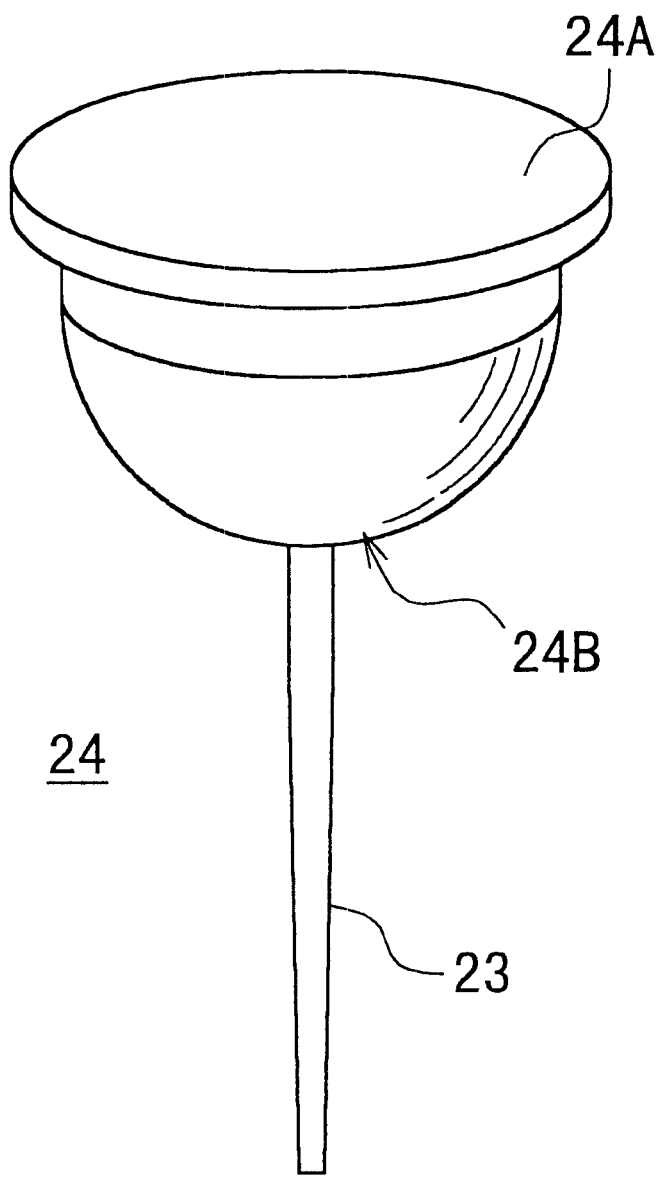
FIG. 4 is a perspective view showing a convex mirror used in the omnidirectional camera device according to the embodiment of the present invention.

The convex mirror 24 fixedly attached to the upper end of the tube assembly 20 comprises a disk-like base 24A and a hemispherical convex portion 24B formed as one body with this base 24A as shown in FIG. 4. As shown in FIG. 4, the convex mirror 24 is generally attached to the omnidirectional camera device 10 in such a manner that its convex portion 24B is directed downward. The convex mirror 24 is produced by molding of a suitable material such as brass. The convex portion 24B is produced by mirror finishing.

As shown in FIG. 3, a center needle 23 is fixedly fitted into the convex mirror 24 at its top along the optical axis of the concave portion 24B in such a manner that it may be projected to the outside from the mirror-finished surface of the concave portion 24B by a predetermined length. The center needle 23 having predetermined length and thickness is such one that is used to hinder undesired reflected light from being introduced into the side of the video camera 32.

As shown in FIG. 3, the base 24A has an outer diameter which is substantially the same as that of the tube assembly 20. The convex portion 24B has an outer diameter which is substantially the same as an inner diameter of the tube assembly 20 in such a manner that it may be fixedly fitted into the inner surface of the tube assembly 20. The convex portion 24B has a concave groove 25 formed at a boundary between it and the base 24A. This concave groove 25 is used to prevent an adhesive from being leaked into the mirror-finished surface side when the convex mirror 24 is bonded to the upper end surface of the tube assembly 20 by a suitable means such as an adhesive.

An annular flange 26 which is fitted into the above-mentioned concave groove 25 is formed as one body with the inner surface of the tip end of the tube assembly 20. The convex mirror 24 is fixedly inserted into the inside of the tube assembly 20 from the upper end as in the illustrated state. The convex mirror 24 may be fixed to the upper end of the tube assembly 20 by a suitable means such as an adhesive if necessary A cap 28 is fixedly mounted on the side of the base 24A of the convex mirror 24. If necessary, the cap 28 maybe strongly fixed to the convex mirror 24 and the tube assembly 20 by a suitable means such as an adhesive.

The video camera 32 is fixedly mounted on the lower end side of the tube assembly 20 through an optical system 30. The optical system 30 comprises a cylindrical lens-barrel 34 and one or a plurality of optical lenses 36 secured within the lens-barrel 34. A thread groove 38 is formed on the inner surface of the lower end of the tube assembly 20. The thread groove 38 is meshed with a thread groove 40 formed around the outer peripheral portion of the tip end of a housing 50 through a rubber ring 37 mounted on the inside of the tube assembly 20, thereby resulting in the optical system 30 being formed as one body with the housing 50. By changing the depth in which the optical system 30 is meshed with the housing 50, it is possible to adjust an optical distance between the optical system 30 and an image pickup element, e.g. a two-dimensional sensor (CCD (charge-coupled device) sensor) 42 fixed to the inside of the housing 50.

The housing 50 is secured to the tube assembly 20 by a connection ring 44. The connection ring 44 is a cylindrical member having an annular flange 48 formed on the lower end thereof. The connection ring 44 has a screw thread 46 formed around the inner periphery of the tip end thereof. The flange 48 also has a screw thread 49 formed in the inside portion thereof. Then, the screw thread 46 of the connection ring 44 is engaged into the lower end of the tube assembly 20, and the housing 50 is engaged into the connection ring 44. Thus, the housing 50 of the video camera 32 can be fixedly attached to the tube assembly 20 through the connection ring 44.

The video camera 32 is attached to the tube assembly 20 in such a manner that the optical axis of the video camera 32 may agree with that of the convex mirror 24. With this arrangement, the tube assembly 20, the convex mirror 24 and the video camera 32 may be formed as one body under the condition that an optical axis Lb of the convex mirror 24 and an optical axis Lc of the video camera 32 are arrayed on substantially the same line.

With this arrangement, since images of objects in the angular extent of 360 degrees about the tube assembly 20 may be displayed on the convex mirrors 24, if such images of objects are focused on the two-dimensional sensor 42 of the video camera 32, then the video camera 32 is able to pick up images of objects in all directions of 360 degrees.

According to the present invention, in addition to the above-mentioned arrangement, a cover assembly 60 for restricting the range in which an image of an object is picked up is detachably attached to this tube assembly 20. The cover assembly 60 is the shielding assembly for shielding the introduction of external light from a part of the outer peripheral surface of the tube assembly 20. The cover assembly 60 comprises a mount head (attachment head) 60A to be attached to the tube assembly 20 and a cover member (fan-like fin) 60B unitarily communicated with the mount head 60A.

Figure 5:
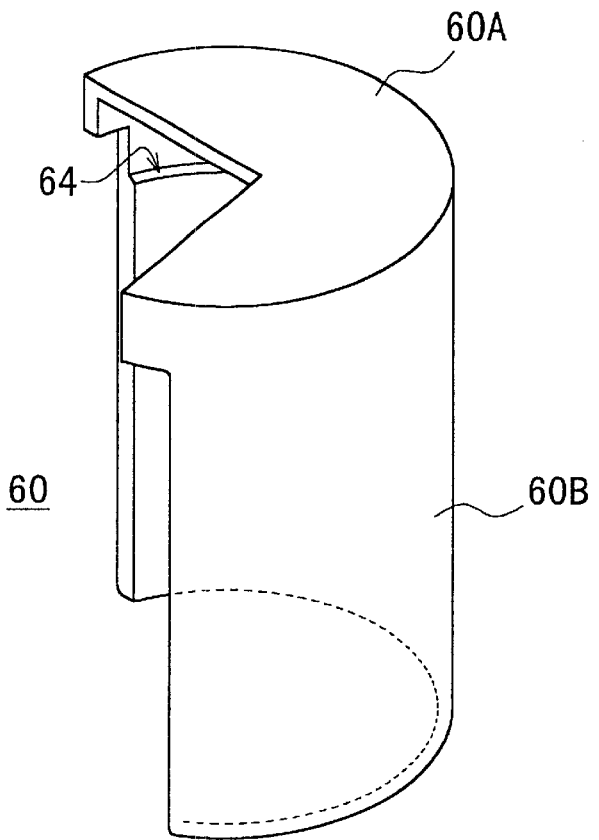
FIG. 5 is a perspective view showing an example of a cover assembly of the omnidirectional camera device according to the present invention.
Figure 6:
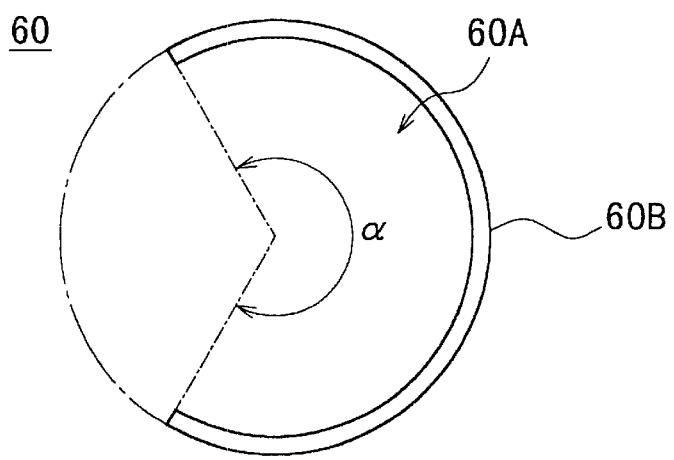
FIG. 6 is a diagram showing an angle at which a cover member is opened.

The cover member 60B forms apart of the tube assembly, and is formed in a predetermined angular extent α as shown in FIG. 6. The angular extent α in which incident light should be shielded is set in accordance with a use of the camera device. The cover member 60B may be made long enough to cover the cover assembly 60 approximately up to the position at which the rubber ring 37 is attached. In response to the shielding angle α of the cover member 60B, as shown in FIG. 5, the mount head 60A also is recessed by an angle (360°−α) where α>180°.

As shown in FIG. 3, the mount head 60A is mounted on the cover assembly 60 so as to close the cap 28 attached to the upper end of the tube assembly 20. At that very time, in order to protect the cover assembly 60 from being disengaged from the tube assembly 20, the cover member 60B includes an engagement step portion 64 formed on the inner surface thereof at its portion in which the engagement step portion 64 may contact with the end of the flange 28a of the cap 28.

When the cover assembly 60 is attached to the tube assembly 20, the cover assembly 60 is attached to the tube assembly 20 under the condition that the cover member 60B thereof is nearly closely contacted with the outer peripheral surface of the tube assembly 20 with the result that external light from the side of the cover member 60B may be prevented from entering the inside of the tube assembly 20. That is, external light existing in the angular extent a may be shielded completely.

In the case of the cover assembly 60 in which the shielded angular extent α exceeds 180 degrees as shown in FIG. 6, the cover assembly 60 may be nearly reliably attached to the tube assembly 20 by the engagement step portion 64 formed on the side of the mount head 60A. Also, since the band-like engagement step portion 64 formed on the inner surface of the cover member 60B functions as a rotation step portion for rotating the cover assembly 60 relative to the tube assembly 20, the opening direction relative to the tube assembly 20, i.e. the shielding region may be adjusted by rotating the cover assembly 60. As the cover assembly 60, it is possible to use such a cover assembly which is produced by molding a suitable material such as plastics.

Although there still remains a risk that light incident on the inner surface of the cover member 60B will be reflected on the cover assembly 60 and again introduced into the convex mirror 24, light that was again introduced into the convex mirror 24 may be interrupted by the center needle 23 and thereby can be prevented from becoming incident on the video camera 32. By way of precaution, the inner surface of the cover member 60B may be coated with an optical absorption film.

Figure 7:
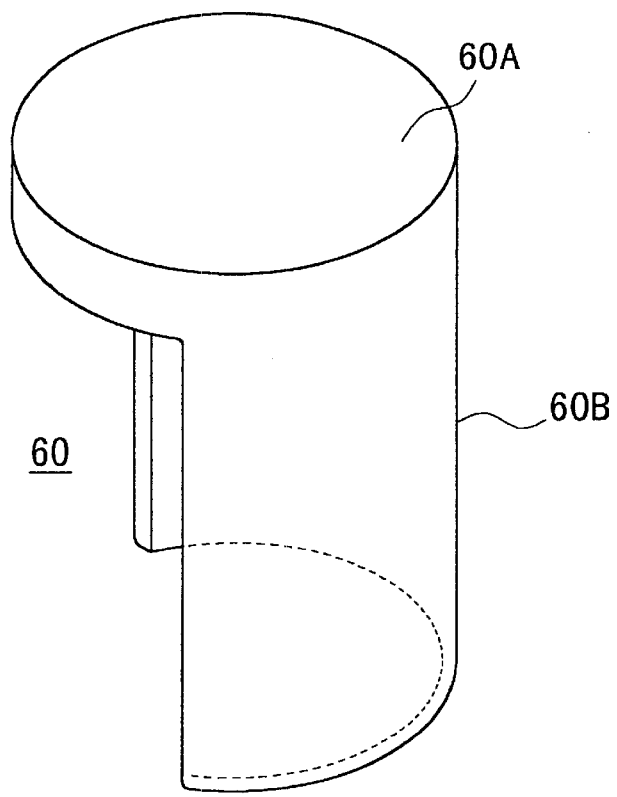
FIG. 7 is a perspective view showing other example of a cover assembly of the omnidirectional camera device according to the embodiment of the present invention.
Figure 8:
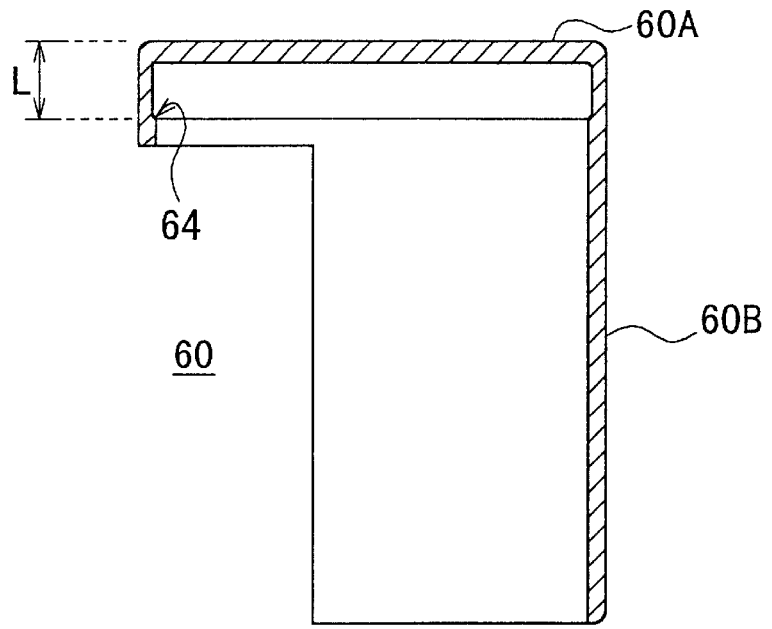
FIG. 8 is a cross-sectional view of FIG. 7.

Although the mount head 60A shown in FIG. 5 is recessed in response to the shielding angle α, such recessed portion is not always required but instead the mount head 60A maybe modified as amount head 60A by which the cap 28 is completely closed as shown in FIG. 7. In this case, as shown in FIG. 8, a circumferential engagement step portion 64 is formed on the inner surface of the cover assembly 60B and the mount head 60A. By this circumferential engagement step portion 64, the cover assembly 60 may be fixed to the tube assembly 20 more reliably.

Figure 9:
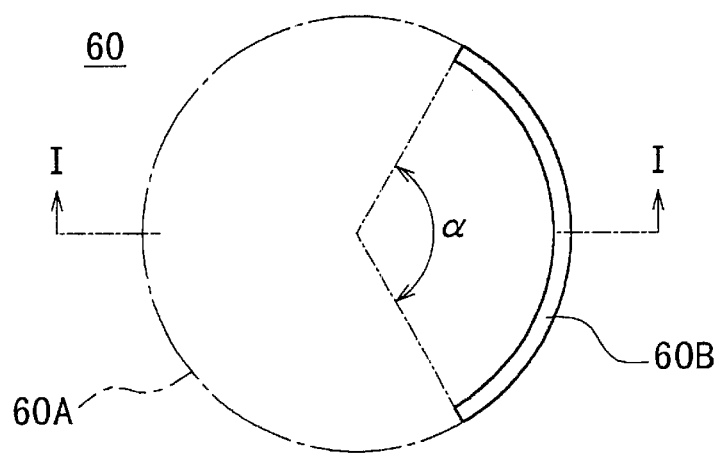
FIG. 9 is a diagram showing an angle at which the cover assembly of other example is opened.
Figure 10:
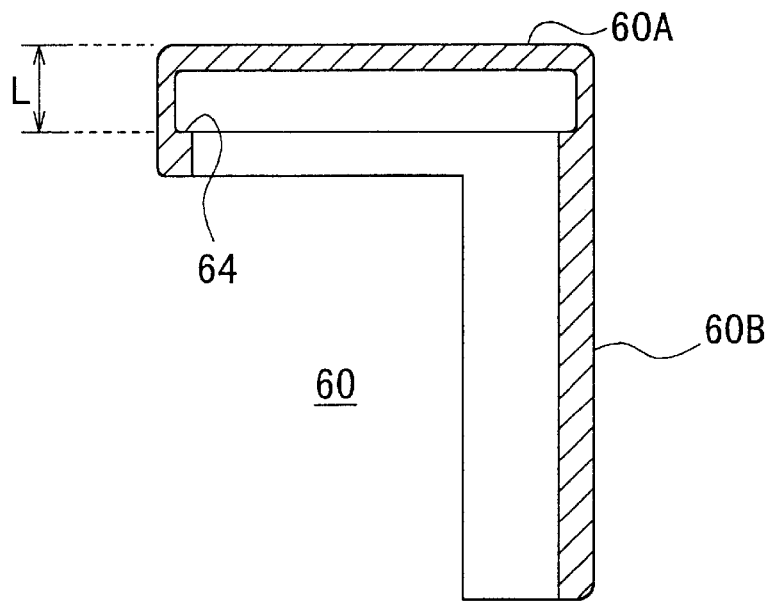
FIG. 10 is a cross-sectional view taken along the line I—I in FIG. 9.

When the shielding angle α of the cover member 60B is less than 180 degrees as shown in FIG. 9, in order that the mount head 60A may completely cover the cap 28 similarly to FIG. 7, the mount head 60A may be shaped in such a way as to completely close the cap 28 as shown in FIG. 10.

Figure 11:
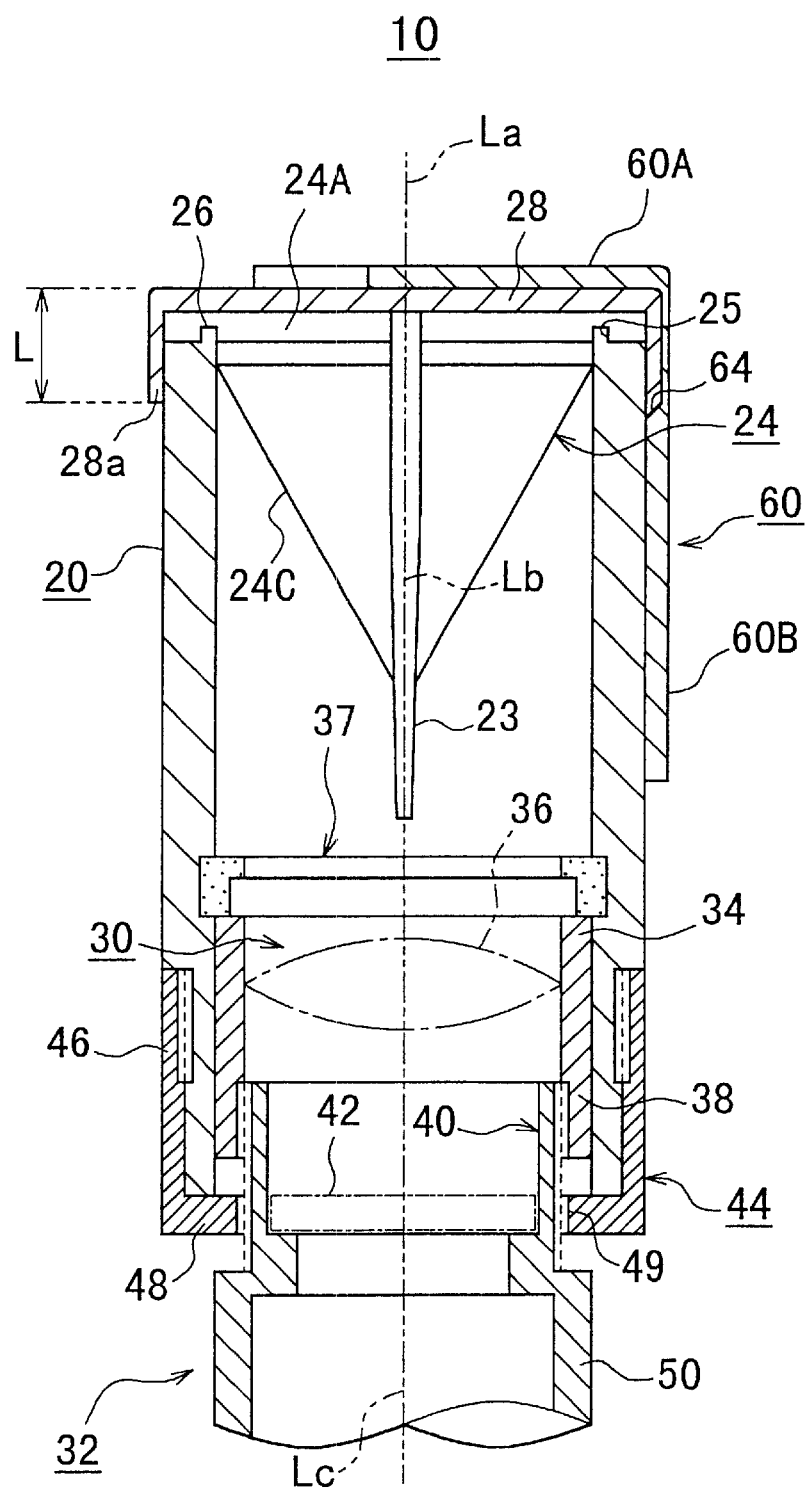
FIG. 11 is a cross-sectional view similar to FIG. 3, and illustrates a convex mirror according to other embodiment of the present invention.
Figure 12:
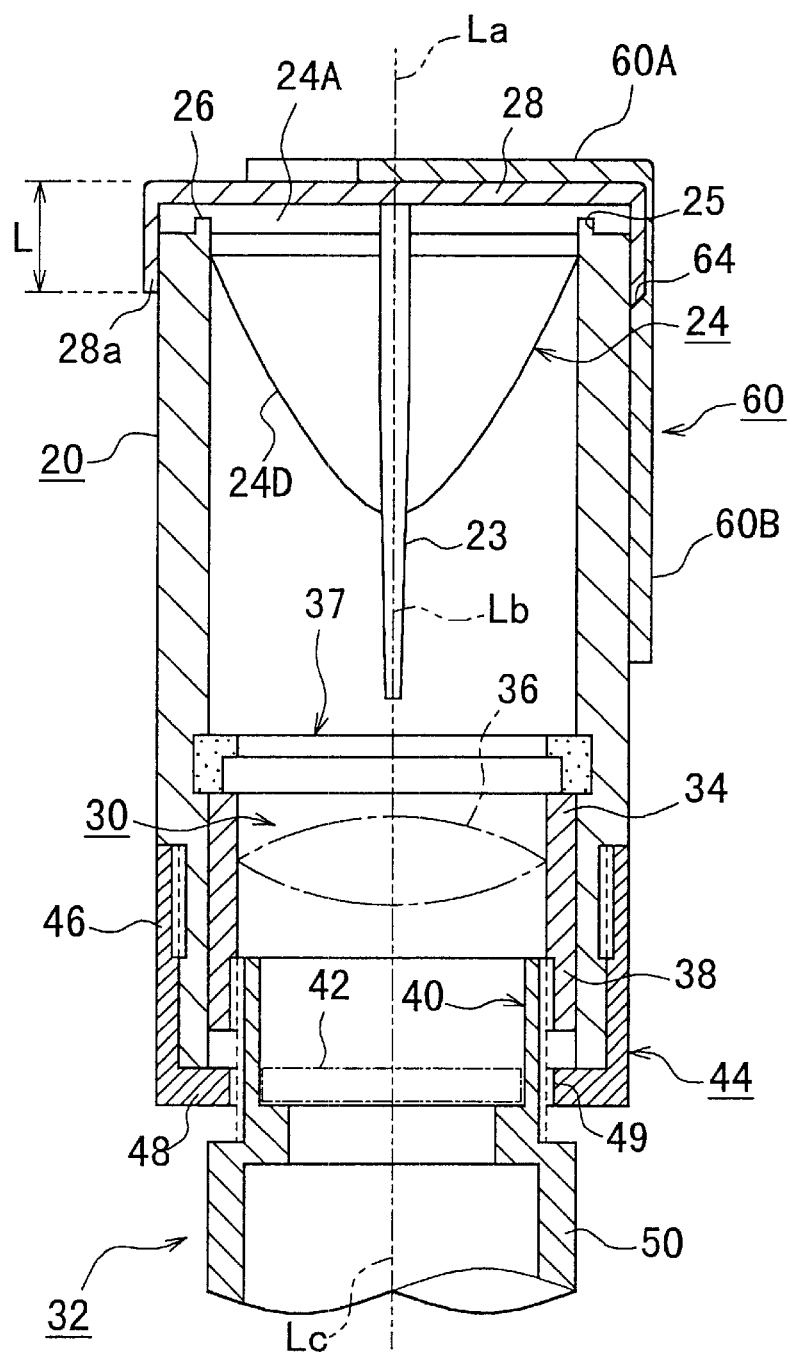
FIG. 12 is a cross-sectional view similar to FIG. 3, and illustrates a convex mirror according to a further embodiment of the present invention.

FIGS. 11 and 12 are cross-sectional views showing modified examples of the convex mirror 24 shown in FIGS. 3 and 4. While the example shown in FIGS. 3 and 4 uses a part of a hemisphere as the convex portion 24B, the modified example shown in FIG. 11 uses an approximately truncate circular cone surface as a convex portion 24C, and the modified example shown in FIG. 12 uses a circular cone surface forming approximately a surface of parabolic type as a convex portion 24D. In either case, it is possible to obtain image information of a predetermined angular extent by image processing.

Figure 13:
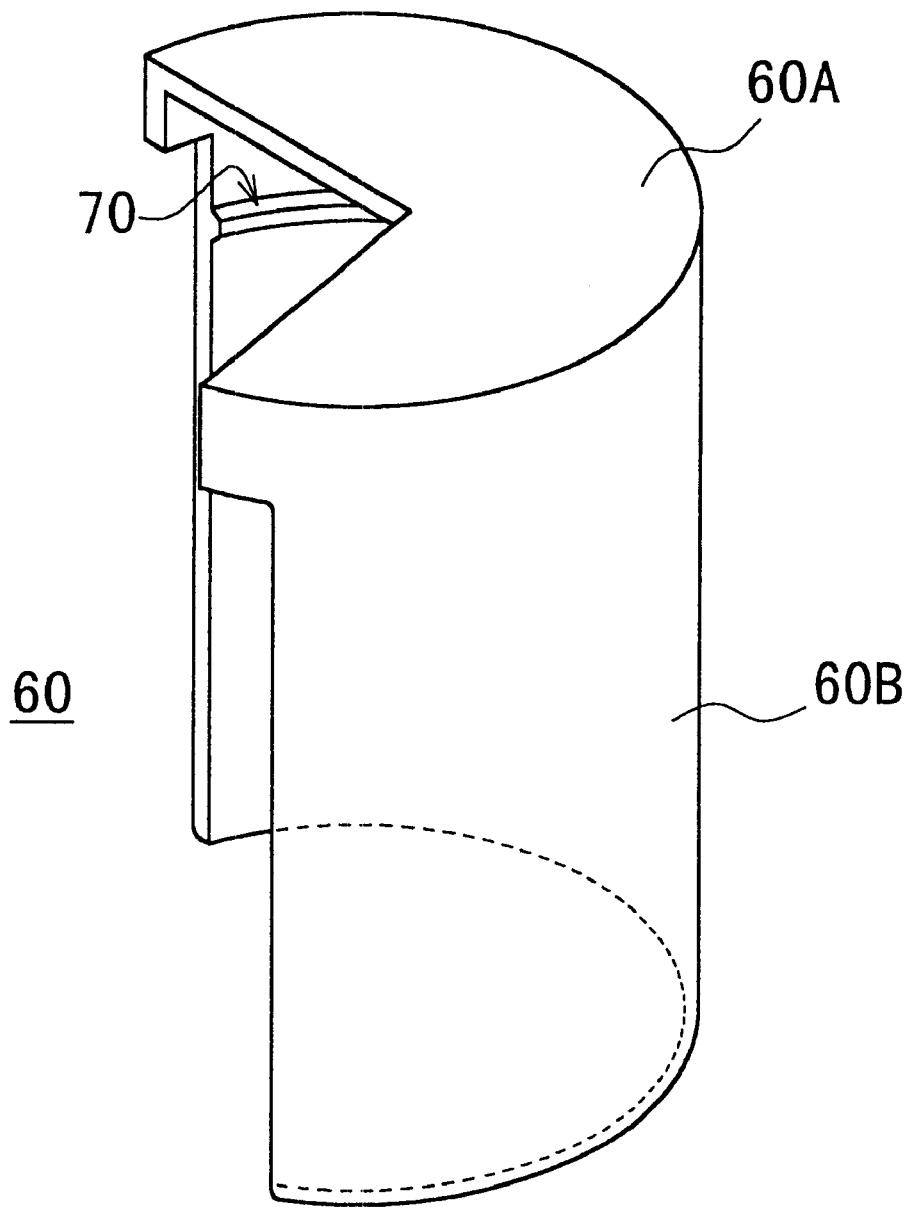
FIG. 13 is a perspective view showing a cover assembly according to a further embodiment of the present invention.

FIG. 13 shows a further modified example of FIG. 5. While the annular engagement step portion is formed by making the thickness of the cover member 60B communicating with the step portion 64 the same in FIG. 5, according to the further modified example of FIG. 13, the step portion 64 might be replaced with an annular protrusion 70 formed on the inside of the cover member 60B. According to this annular protrusion 70, the thickness of the cover member 60B can be reduced. Further, since the annular protrusion 70 prevents the inner surface of the cover member 60B from contacting with the outer peripheral surface of the tube assembly 20, there are then the advantages that the rotation of the cover assembly 60 can be adjusted easier and that the outer peripheral surface of the tube assembly 20 can be made difficult to damage.

Figure 14:
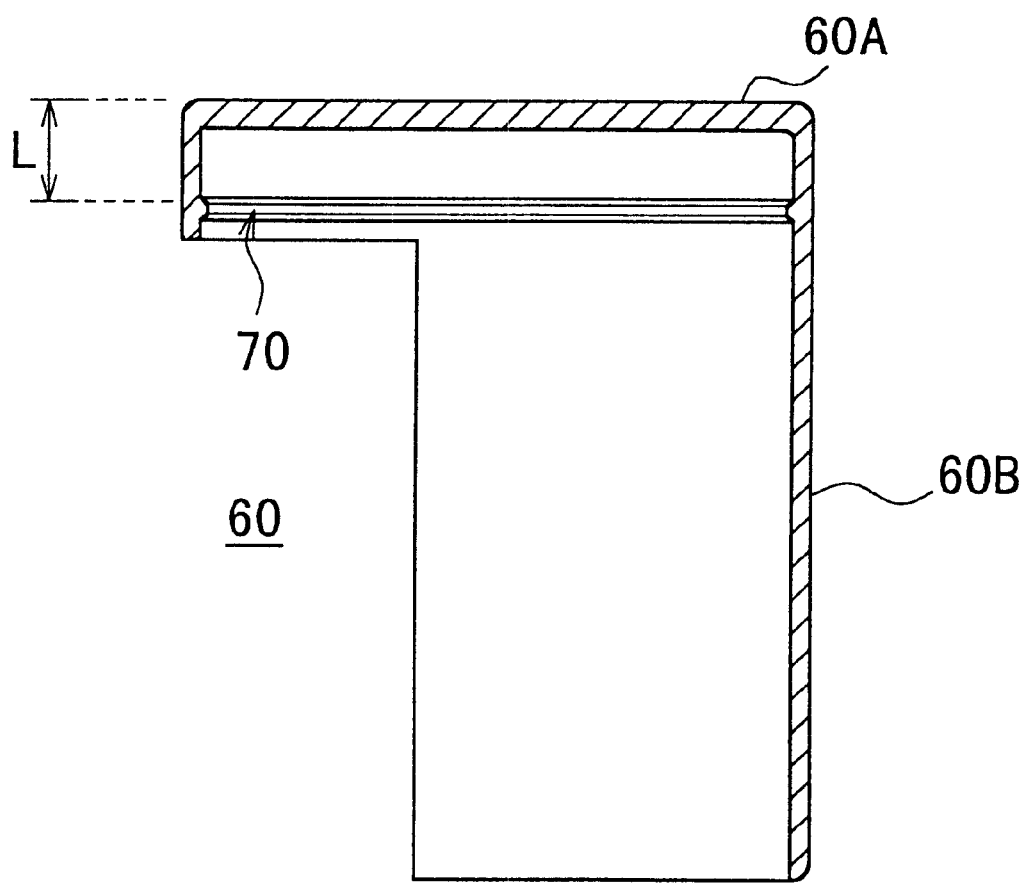
FIG. 14 is a cross-sectional view showing a cover assembly according to yet a further embodiment of the present invention.

FIG. 14 shows a still further modified example of FIG. 11. Also in this case, the step portion 64 is replaced with the annular protrusion 70 formed on the inside of the cover member 60B. With this arrangement, there can be achieved the effects that the thickness of the cover member 60B maybe reduced without degrading the engagement effect.

As set forth above, according to the present invention, the omnidirectional camera device includes the cover assembly which can shield undesired incident light.

According to the present invention, since incident light is shielded by the cover assembly, undesired information can be completely eliminated, and images of objects existing only in the necessary directions and in the necessary angular extent can be picked up reliably. Since the extent in which incident light should be shielded and the direction of incident light that should be shielded may be determined by adjusting the attachment position of the cover assembly, the shielding range can be set in accordance with the use of the camera device. Furthermore, since the direction in which incident light should be shielded may be adjusted extremely easily, the omnidirectional camera device according to the present invention can cope with the change of the use of the camera device freely.

Therefore, the omnidirectional camera device according to the present invention is extremely suitable as a surveillance camera installed within the shop or the room and also suitable as a camera device for effecting a demonstration in an exhibition hall.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An omnidirectional camera device comprising:
   a rotationally-symmetric convex mirror fixedly attached to one end of a transparent tube assembly;
   image pickup means disposed on the other end of said tube assembly in an opposing relation to said convex mirror; and
   a cover assembly being disposed on a side of said tube assembly so as to restrict an extent in which light becomes incident on said convex mirror.

2. An omnidirectional camera device as claimed in claim 1, wherein said cover assembly comprises a mount head mounted on one end side of said tube assembly and a cover member having a fan-like shielding angle for said mount head.

3. An omnidirectional camera device as claimed in claim 1, wherein said cover assembly is a shielding member attached to said tube assembly so as to become freely rotatable.

4. An omnidirectional camera device as claimed in claim 1, wherein a center axis of said tube assembly, an optical axis passing a top of said convex mirror and an optical axis of said image pickup means substantially agree with each other.

5. An omnidirectional camera device as claimed in claim 1, wherein said image pickup means is a video camera and an image pickup element disposed in said image pickup means is a two-dimensional CCD (charge-coupled device).

6. An omnidirectional camera device as claimed in claim 1 wherein said cover assembly is sized to closely contact a portion of an outer peripheral surface of said transparent tube assembly when installed thereon.

7. The omnidirectional camera according to claim 1, wherein said cover assembly comprises a head mount attached to an end of the tube assembly and a cover member connected to the head mount.

8. The omnidirectional camera according to claim 7, wherein said cover member comprises a fan-like fin.

9. The omnidirectional camera according to claim 7, wherein an inner surface of the cover member has a coating disposed thereon.

10. The omnidirectional camera according to claim 1, wherein the cover assembly is adjustable so that a range of incident light shielded by the cover assembly can be set in accordance with a use of the omnidirectional camera.

11. The omnidirectional camera according to claim 1, wherein the omnidirectional camera is a security camera in a room.

12. An omnidirectional camera device comprising:

a rotationally-symmetric convex mirror fixedly attached to one end of a transparent tube assembly;

image pickup means disposed an the other end of said tube assembly in an opposing relation to said convex mirror; and a cover assembly being disposed on said tube assembly so as to restrict an extent in which light becomes incident on said convex mirror;

wherein said cover assembly comprises a mount head mounted on one end side of said tube assembly and a cover member having a fan-like shielding angle for said mount head.

13. The omnidirectional camera according to claim 12, wherein an inner surface of the cover assembly is coated with an optical absorption film.

14. The omnidirectional camera according to claim 12, wherein the omnidirectional camera is a security camera mounted in a room.

* * * * *